(12) United States Patent
Shen et al.

(10) Patent No.: US 11,727,079 B2
(45) Date of Patent: *Aug. 15, 2023

(54) COOPERATIVE WEB BROWSING USING MULTIPLE DEVICES

(71) Applicant: Microsoft Technology Licensing, LLC, Redmond, WA (US)

(72) Inventors: Huifeng Shen, Beijing (CN); Shipeng Li, Palo Alto, CA (US); Yan Lu, Beijing (CN); Zhaotai Pan, Anhui (CN); Jianfeng Wang, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/189,882

(22) Filed: Mar. 2, 2021

(65) Prior Publication Data

US 2021/0192005 A1 Jun. 24, 2021

Related U.S. Application Data

(63) Continuation of application No. 15/619,248, filed on Jun. 9, 2017, now Pat. No. 10,970,355, which is a continuation of application No. 13/585,185, filed on Aug. 14, 2012, now Pat. No. 9,721,036.

(51) Int. Cl.
*G06F 16/957* (2019.01)

(52) U.S. Cl.
CPC .................. *G06F 16/9577* (2019.01)

(58) Field of Classification Search
None
See application file for complete search history.

(56) References Cited

U.S. PATENT DOCUMENTS

| | | | | |
|---|---|---|---|---|
| 2011/0138416 A1* | 6/2011 | Kang | .................. | H04N 21/4821 725/39 |
| 2011/0163939 A1* | 7/2011 | Tam | ..................... | G06F 3/1454 345/2.3 |
| 2012/0054616 A1* | 3/2012 | Mittal | .................. | G06F 16/957 715/722 |
| 2013/0194510 A1* | 8/2013 | Freundlich | ......... | H04N 21/4122 348/723 |
| 2014/0013342 A1* | 1/2014 | Swan | ................. | H04N 21/4821 725/92 |

OTHER PUBLICATIONS

Sujeet Mate, Umesh Chandra, and Igor D. D. Curcio, Movable-multimedia: session mobility in ubiquitous computing ecosystem, 2006, In Proceedings of the 5th international conference on Mobile and ubiquitous multimedia (MUM '06). Association for Computing Machinery. pp. 1-8. (Year: 2006).*

* cited by examiner

Primary Examiner — Ariel Mercado (57) ABSTRACT

A computer-implemented method for displaying at least a portion of content being displayed on a first device to also be displayed on a second device. The method includes causing content to be displayed on a first device. The method then includes detecting a second device to concurrently display at least a portion of the content being displayed on the first device. A capability of the first device is compared with a capability of the second device. Based on the comparing, the at least the portion of the content is automatically provided to be displayed on the second device.

20 Claims, 9 Drawing Sheets

COOPERATIVE WEB BROWSING USING MULTIPLE DEVICES

RELATED APPLICATIONS

This application is a continuation of U.S. patent application Ser. No. 15/619,248, filed on Jun. 9, 2017, now issued as U.S. Pat. No. 10,970,355, which is a continuation of U.S. patent application Ser. No. 13/585,185, filed on Aug. 14, 2012, and now issued as U.S. Pat. No. 9,721,036, the contents of which are incorporated by reference in their entirety herein.

BACKGROUND

Internet browsing or surfing has become popular for home entertainment. Traditionally, web browsing can only be done on a personal computer (PC). With the advance of mobile technology, surfing the Internet using mobile devices, such as mobile phones and tablets, is feasible and becomes prevalent. However, since the mobile devices usually have very limited display sizes and computing power, etc., mobile devices are unsuitable for Internet surfing for a long period of time. Personal computers and televisions, though equipped with better displays and audio speakers, are not portable as flexibly as the mobile devices. Furthermore, the televisions, even web-based smart televisions, normally do not provide a functionality of text inputting that is frequently used in web browsing. In other words, web browsing using a single device unavoidably suffers from limited capabilities provided by that single device, forcing a user to sacrifice one browsing quality factor (e.g., mobility, etc.) in exchange for another browsing quality factor (e.g., video display quality, etc.).

SUMMARY

This summary introduces simplified concepts of cooperative web browsing of multiple devices, which are further described below in the Detailed Description. This summary is not intended to identify essential features of the claimed subject matter, nor is it intended for use in limiting the scope of the claimed subject matter.

This application describes example embodiments of cooperative web browsing of multiple client devices. In one embodiment, a proxy server may receive a browsing request from a first client device of a plurality of client devices of a user to access a website. In one embodiment, the proxy server may be a server installed in a cloud computing architecture. In some embodiments, the proxy server may be installed in a computing device that is local or in proximity to the plurality of client devices of the user. In one embodiment, the proxy server may be independent of the website, i.e., not affiliated with or part of the website, for example. In response to receiving the browsing request, the proxy server may obtain content associated with the website, for example, a web page, for the user. The proxy server may parse and render the content on behalf of the plurality of client devices of the user. In one embodiment, upon parsing and rendering the content associated with the website, the proxy server may encode and selectively provide portions of the rendered content to the plurality of client devices for consumption by the user.

In some embodiments, the proxy server may receive a request to transfer a browsing session from a first client device to a second client device. The request may include, but is not limited to, a move request, a copy request or a switch request. In response to receiving the request, the proxy server may redirect a connection of an instance of a virtual browser associated with the browsing session of the first client device at the proxy server from the first client device to the second client device. The proxy server may then selectively serve new content of the browsing session to the second device based on one or more capabilities of the second client device.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

As noted above, web browsing using any single type of devices unavoidably suffers from limited capabilities of respective type of devices that a user normally needs to sacrifice one browsing quality factor (e.g., mobility, etc.) in exchange for another browsing quality factor (e.g., video display quality, etc.).

This disclosure describes a cooperative web browsing system, which facilitates cooperative web browsing using multiple devices of a user. In one embodiments, the multiple devices of the user may include devices having different or same web browsing capabilities. By way of example and not limitation, the devices of different or same web browsing capabilities may include, but are not limited to, devices that include or are associated with web browsers and/or physical or soft keyboards (e.g., computers, tablets, smartphones, etc.). Additionally, the devices of different or same web browsing capabilities may include, for example, devices that include or are associated with limited or no web browsers and/or limited or no physical or soft keyboards (e.g., televisions, etc.).

In one embodiment, the cooperative web browsing system may include a proxy server. The proxy server provides a centralized thin-client browser framework that enables interactions among the plurality of devices and facilitates cooperative web browsing of the plurality of devices regardless of whether one or more of the plurality of devices having limited or no capabilities of web browsing and/or user input functionalities (such as text inputting, moving and/or zooming of a web page, etc.) for web browsing. In one embodiment, the proxy server may maintain a virtual web browser. The virtual web browser may execute all browser-engine logics and maintain state information of all active browsing sessions associated with the plurality of devices of the user. For example, the virtual web browser may be configured to parse and render web pages on behalf of the plurality of devices of the user. After parsing and rendering the web pages, the proxy server may encode the rendered images of the web pages and stream the rendered images to the plurality of devices. The plurality of devices of the user may therefore need only capabilities of decoding the encoded images and displaying decoded images of the web pages to the user.

In some embodiments, the cooperative web browsing system may further include a touch controller as a remote controller for one or more of the plurality of devices of the user. In one embodiment, the touch controller may include a mobile device (such as a smartphone, a tablet, etc.) installed with a touch controller client. The cooperative web browsing system may employ the touch controller as a remote controller for other devices that have limited user input capabilities, for example, devices having limited or no capabilities of allowing the user to input text in a textbox in a web page, moving or zooming a certain part of the web page displayed on respective displays or screens, etc. In one embodiment, the proxy server may serve interactive portions (such as selectable and/or clickable controls, links, etc.) of a web page to the touch controller. Additionally or alternatively, the proxy server may serve a portion less than all of the web page that is currently displayed in another device. The proxy may allow a user to manipulate content of the web page to be displayed in the other device (e.g., the television, etc.) by manipulating the interactive portions (or data included in the portion less than all) of the web page displayed on a display of the touch controller.

In one embodiment, the proxy server may further enable seamless migration of a browsing session from one device to another device. The proxy server may automatically migrate a browsing session from a first device to a second device in response to detecting that the second device is present in a neighborhood of the first device and determining that the second device has a better capability of serving content that is currently served by the first device. Additionally or alternatively, the proxy server may migrate a browsing session from a first device to a second device in response to receiving a migration request from the user through the first device or the second device. In one embodiment, the migration request may include a move request, a copy request and/or a switch request, etc. The proxy server may perform this migration of the browsing session by redirecting a connection of an instance of the virtual web browser at the proxy server from the first device to the second device and serving content of the web page rendered by that instance of the virtual web browser to the second device through the redirected connection. Since the content of the web page has been rendered by the virtual web browser and states of browsing sessions are maintained in the virtual web browser, the second device can simply and quickly display the rendered content to the user without obtaining and knowing information of past web browsing in the first device.

In some embodiments, the cooperative web browsing system may allow the user to provide a voice input or command through the touch controller, for example. The user may perform the aforementioned operations using a voice input or command in cooperation with or in alternative to a touch input (e.g., through a finger, a digital pen, a stylus, etc.) on the touch controller.

The described system provides a centralized thin-client framework for a plurality of client devices of a user, and moves parsing and rendering of a web page from a client side to a proxy side, thereby alleviating computing burden of the client devices.

While in the examples described herein, the cooperative web browsing system receives a browsing request from one of a plurality of devices, obtains content of a web page, parses and renders the content of the web page, encodes the rendered content, and streams the encoded content to the plurality of devices of the user, in other embodiments, these functions may be performed by multiple separate systems or services in a cloud computing architecture and/or multiple devices. For example, in one embodiment, a request service may receive a request including a browsing request and/or a migration request, while a separate service may obtain content of the web page in response to receiving the browsing request, and yet another service may perform migration of a browsing session from one device to another. A parsing and rendering service may parse and render the content of the web page, while an encoding service may encode the rendered content, and stream the encoded content to the plurality of client devices of the user.

The application describes multiple and varied implementations and embodiments. The following section describes an example environment that is suitable for practicing various implementations. Next, the application describes example systems, devices, and processes for implementing a cooperative web browsing system.

Exemplary Environment

Figure 1:
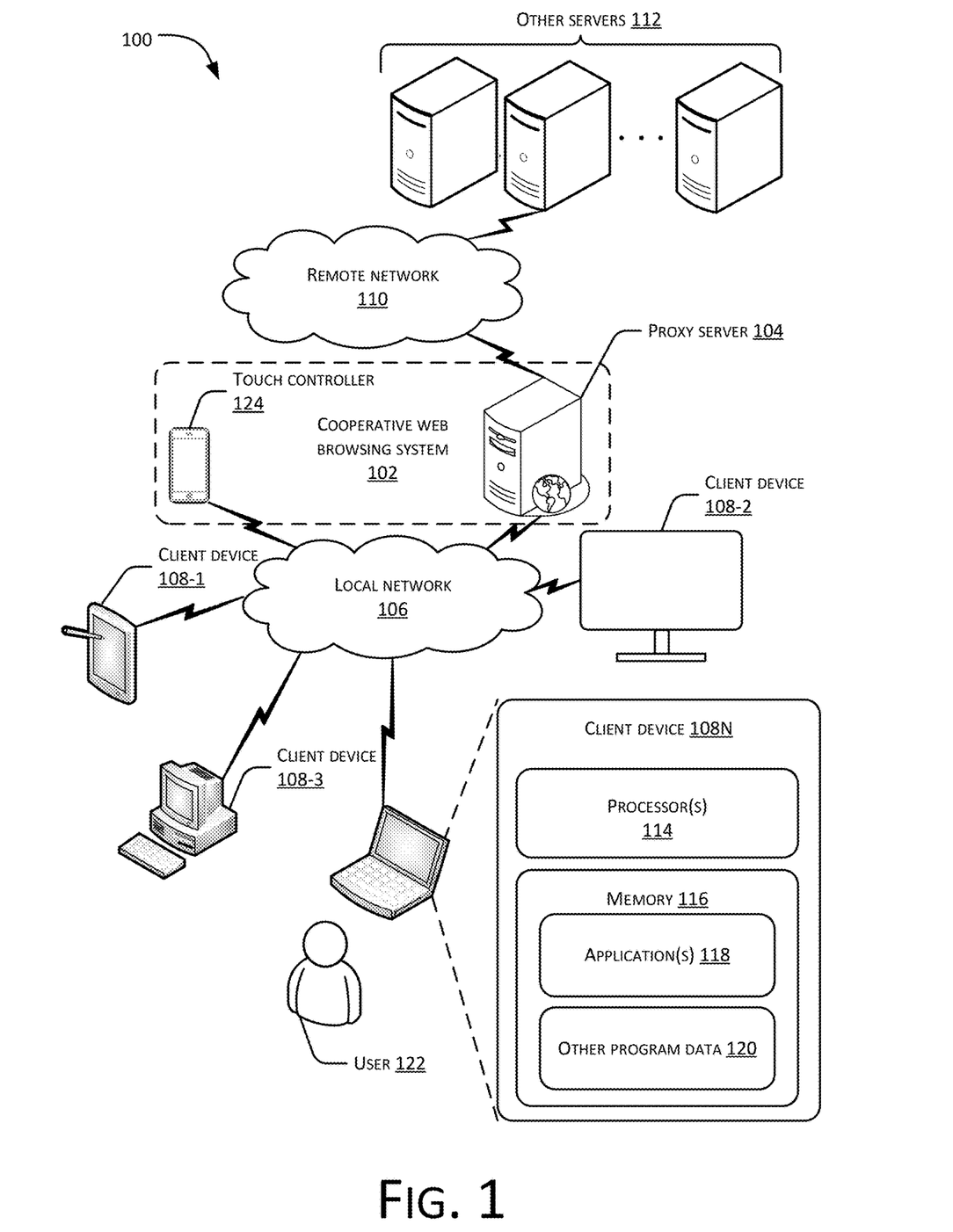
FIG. 1 illustrates an example environment usable to implement an example cooperative web browsing system.

FIG. 1 illustrates an exemplary environment 100 usable to implement a cooperative web browsing system 102 including a proxy server 104. In some embodiments, the environment 100 may include a local network 106 and a plurality of client devices 108-1, 108-2, 108-3, . . . , 108-N (collectively referred to as client device 108). The plurality of client devices 108 may communicate data with the proxy server 104 via the local network 106. In one embodiment, the plurality of client devices 108 may further communicate data with each other via the local network 106 and/or the proxy server 104. In some embodiments, the environment 100 may further include a remote network 110 and other servers 112. In one embodiment, the plurality of client devices 108 may connect to the remote network 110 and the other servers 112 via the proxy server 104 when engaged in cooperative web browsing. Additionally or alternatively, in some embodiments, one or more of the plurality of client devices 108 may directly communicate data with the other server 112 via the remote network 110.

Although the proxy server 104 is described to be separate from the plurality of client devices 108, in some embodiments, functions of the proxy server 104 may be included and distributed among one or more client devices 108. For example, one of the client devices 108 may include part of the functions of the proxy server 104 while other functions of the proxy server 104 may be included in one or more other client devices 108. Furthermore, in some embodiments, the proxy server 104 may be included in a third-party server, such as one or more of the other servers 112. In one embodiment, the proxy server 104 may be part of a cloud computing architecture.

The client device 108-N, representative of the client devices 108, may be implemented as any of a variety of conventional consumer or computing devices including, for example, a television, a setup box, a mainframe computer, a server, a notebook or portable computer, a handheld device, a netbook, an Internet appliance, a tablet or slate computer, a mobile device (e.g., a mobile phone, a personal digital assistant, a smart phone, etc.), etc. or a combination thereof.

The local network 106 may be a wireless or a wired network, or a combination thereof. The local network 106 may be a collection of individual networks interconnected with each other and functioning as a single large network (e.g., the Internet or an intranet). Examples of such individual networks include, but are not limited to, Local Area Networks (LANs), WiFi network, etc. Further, the individual networks may be wireless or wired networks, or a combination thereof.

The remote network 110 may be a wireless or a wired network, or a combination thereof. The remote network 110 may be a collection of individual networks interconnected with each other and functioning as a single large network (e.g., the Internet or an intranet). Examples of such individual networks include, but are not limited to, telephone networks, cable networks, Local Area Networks (LANs), Wide Area Networks (WANs), and Metropolitan Area Networks (MANs). Further, the individual networks may be wireless or wired networks, or a combination thereof.

In one embodiment, some or all of the client devices 108 may include one or more processors 114 coupled to memory 116. The memory 116 includes one or more applications or services 118 (e.g., web browser, etc.) and other program data 120. The memory 116 may be coupled to, associated with, and/or accessible to other devices, such as network servers, routers, and/or the client devices 108. Additionally or alternatively, in some embodiments, some of the client devices 108 (such as television, for example) may include no processor and/or memory as of a computing device.

A user 122 of the plurality of client devices 108 may want to cooperatively browse or access one or more websites or web pages using the plurality of client devices 108. The user 122 may send a request of browsing a web page using a first device 108 (e.g., a mobile device 108-1) to the proxy server 104.

In one embodiment, the cooperative web browsing system 102 may further include a touch controller 124. The touch controller 124 may be included in one or more of the plurality of client devices 108 that include a touch screen or display and has been installed with a touch controller client for the cooperative web browsing system 102. The user 122 may use the touch controller 124 to browse the website or the web page that is displayed in another client device 108 (such as television, for example) that includes no web browser and/or has limited user input capability (such as physical or soft keyboard, mouse, etc.) for normal web browsing operations (e.g., inputting a text, selecting a link, actuating a control, moving up or down, zooming in or out, etc.). Upon receiving the browsing request, the proxy server 104 may obtain content of the requested web page, parse and render the web page, and selectively send portions of the web page to the first device 108 and one or more other devices 108 of the user for cooperative web browsing.

In some embodiments, the cooperative web browsing system 102 may allow the user to provide a voice input or command through the touch controller 124, for example. The user may perform the aforementioned operations using a voice input or command in cooperation with or in alternative to a touch input (e.g., through a finger, a digital pen, a stylus, etc.) on the touch controller 124.

Figure 2:
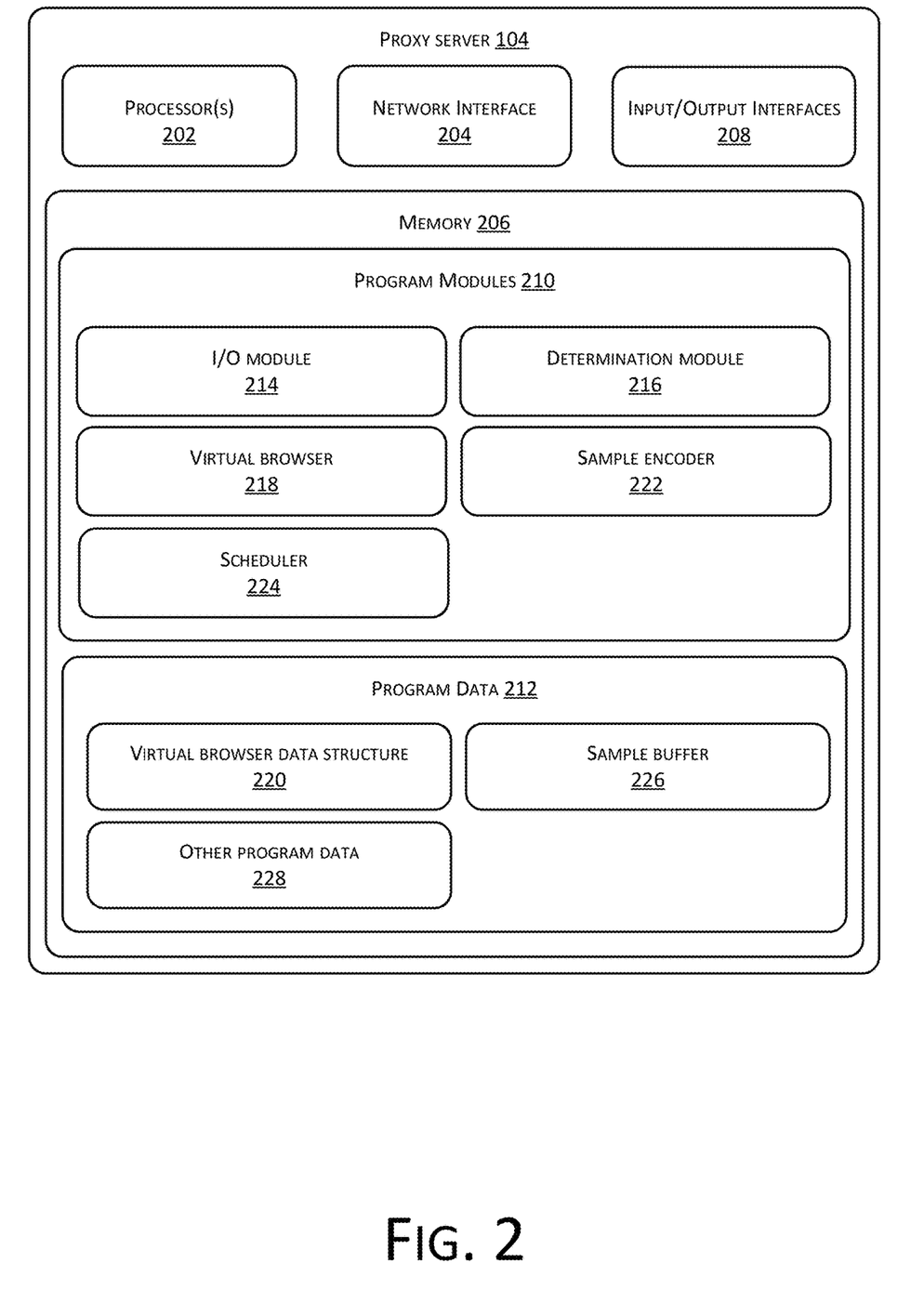
FIG. 2 illustrates an example proxy server included in the example cooperative web browsing system of FIG. 1.

FIG. 2 illustrates the example proxy server 104 in more detail. In one embodiment, the proxy server 104 includes, but is not limited to, one or more processors 202, a network interface 204, memory 206, and an input/output interface 208. The processor(s) 202 is configured to execute instructions received from the network interface 204, received from the input/output interface 208, and/or stored in the memory 206.

The memory 206 may include computer-readable media in the form of volatile memory, such as Random Access Memory (RAM) and/or non-volatile memory, such as read only memory (ROM) or flash RAM. The memory 206 is an example of computer-readable media. Computer-readable media includes at least two types of computer-readable media, namely computer storage media and communications media.

Computer storage media includes volatile and non-volatile, removable and non-removable media implemented in any method or technology for storage of information such as computer readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave, or other transmission mechanism. As defined herein, computer storage media does not include communication media.

The memory 206 may include program modules 210 and program data 212. The proxy server 104 provides a centralized thin-client framework for supporting cooperative web browsing of the plurality of devices 106 of the user 122. In one embodiment, the proxy server 104 may include an I/O module 214. The I/O module 214 is configured to receive requests, instructions and/or control messages from one or more client devices 108 of the user 122. By way of example and not limitation, the I/O module 214 may receive a connection request from a client device 108 (e.g., the client device 108-1) of the user 122 for connecting to the proxy server 104.

In response to receiving the connection request from the client device 108, a determination module 216 of the proxy server 104 may determine whether the client device 108 is allowed or authorized to connect and/or access the cooperative web browsing system 102 and/or the proxy server 104. By way of example and not limitation, the determination module 216 may determine whether a client device 108 is allowed to connect and/or access the cooperative web browsing system 102 and/or the proxy server 104 based on, for example, a device identifier and/or an IP (Internet address) of the client device 108, etc.

Additionally or alternatively, the determination module 216 may determine whether the user 122 is allowed or authorized to use or access the cooperative web browsing system 102 and/or the proxy server 104 using the client device 108. For example, the determination module 216 may prompt the user 122 to provide a password when the user 122 initially tries to access a website or web page through the cooperative web browsing system 102 or the proxy server 104. Additionally or alternatively, the determination module 216 may identify or determine which one or more of the plurality of client devices 108 that the user 122 may be allowed to use during cooperative web browsing.

Additionally or alternatively, in some embodiments, the determination module 216 may further obtain information of the client device 108. In one embodiment, the determination module 216 may obtain the information of the client device 108 based on the device identifier of the client device 108. Additionally or alternatively, the determination module 216 may obtain the information of the client device 108 manually from the user 122. In some embodiments, the determination module 216 may obtain information of the client device 108 related to web browsing capabilities, such as display resolution or quality, audio capability (and/or quality), computing (or processing) power, text inputting capabilities (e.g., whether including a physical or soft keyboard, etc.), whether including a touch screen, etc. The proxy server 104 may use this information of the client device 108 to determine what type of content (e.g., which portions of a web page) may be provided to that client device 108.

In response to successfully authenticating the client device 108 and/or the user 122, the proxy server 104 may create an instance of a virtual browser 218 for the client device 108. Additionally, in some embodiments, the proxy server 104 may further notify other client devices 108 of the user 122 which have been authenticated and currently connected to the cooperative web browsing system 102 that one new client device 108 has joined to the cooperative web browsing system 102 and is available for use and/or migration thereto or therefrom.

In one embodiment, the virtual browser 218 may retrieve, parse and render web pages on behalf of the client device 108 (and/or one or more other client devices 108). In one embodiment, the virtual browser 218 may render the web pages into bitmaps (or display bitmaps) as synthesized by a computing device. In this disclosure, "screen" is used hereinafter to refer to the display bitmap synthesized by the computing device. In one embodiment, the proxy server 104 may store the instance of the virtual browser 218 in a virtual browser data structure 220 corresponding to the user 122. In some embodiments, the virtual browser data structure 220 may include, for example, an array, a list, etc. In one embodiment, a separate virtual browser data structure 220 is used for each user.

In some embodiments, the virtual browser 218 may further extract audio, and web-element side information from the web pages. In one embodiment, web elements may include, but are not limited to, clickable and/or selectable elements (such as hyperlinks, controls, text, etc.) on a web page. The web-element side information may include, but is not limited to, types, positions and visibility properties of the web elements.

In one embodiment, the proxy server 104 may further include a sample encoder 222. The sample encoder 222 may receive data of screen, audio and web elements that has been extracted by the virtual browser 218. Upon receiving the extracted data, the sample encoder 222 may encode different types of data using different encoding mechanisms. By way of example and not limitation, the sample encoder 222 may employ a compression algorithm to compress a web screen as synthesized by the virtual browser 218. The sample encoder 222 may further adaptively identify text blocks and image blocks from screen images and use different encoding algorithms for text and image contents. Details of example compression and encoding algorithms that may be used by the sample encoder 222 will be described in further detail hereinafter.

Upon encoding the extracted data from the virtual browser 218, the proxy server 104 may further include a scheduler 224 that adaptively push the encoded data or samples (e.g., screen samples, audio samples and web element samples) to a sample buffer 226 based on a control message received from the client device 108. For example, the client device 108 may send a control message indicating a selection of a web element such as a link on the web page. In response to receiving the control message, the scheduler 224 may push encoded samples related to the selected web element to the sample buffer 226.

In one embodiment, the I/O module 214 of the proxy server 104 may retrieve the encoded samples from the sample buffer 226 and sends the encoded samples to one or more of the plurality of client devices 108.

In one embodiment, in response to receiving the encoded samples from the proxy server 104 or the I/O module 214, the client device 108 may decode the encoded samples, and composite the web screen, audio and/or web elements spatially and temporally together for presentation to the user 122. In some embodiments, the client device 108 may send one or more control messages to the proxy server 104. The one or more control messages may include, but are not limited to, user input messages, current visible client-region information, network conditions, etc.

In some embodiments, the proxy server 104 may further include other program data 228. The other program data 228 may store device identifiers of the plurality of client devices 108 that are authorized to use and access the cooperative web browsing system 102, passwords of one or more authorized users, log data of web browsing sessions, etc.

Figure 3:
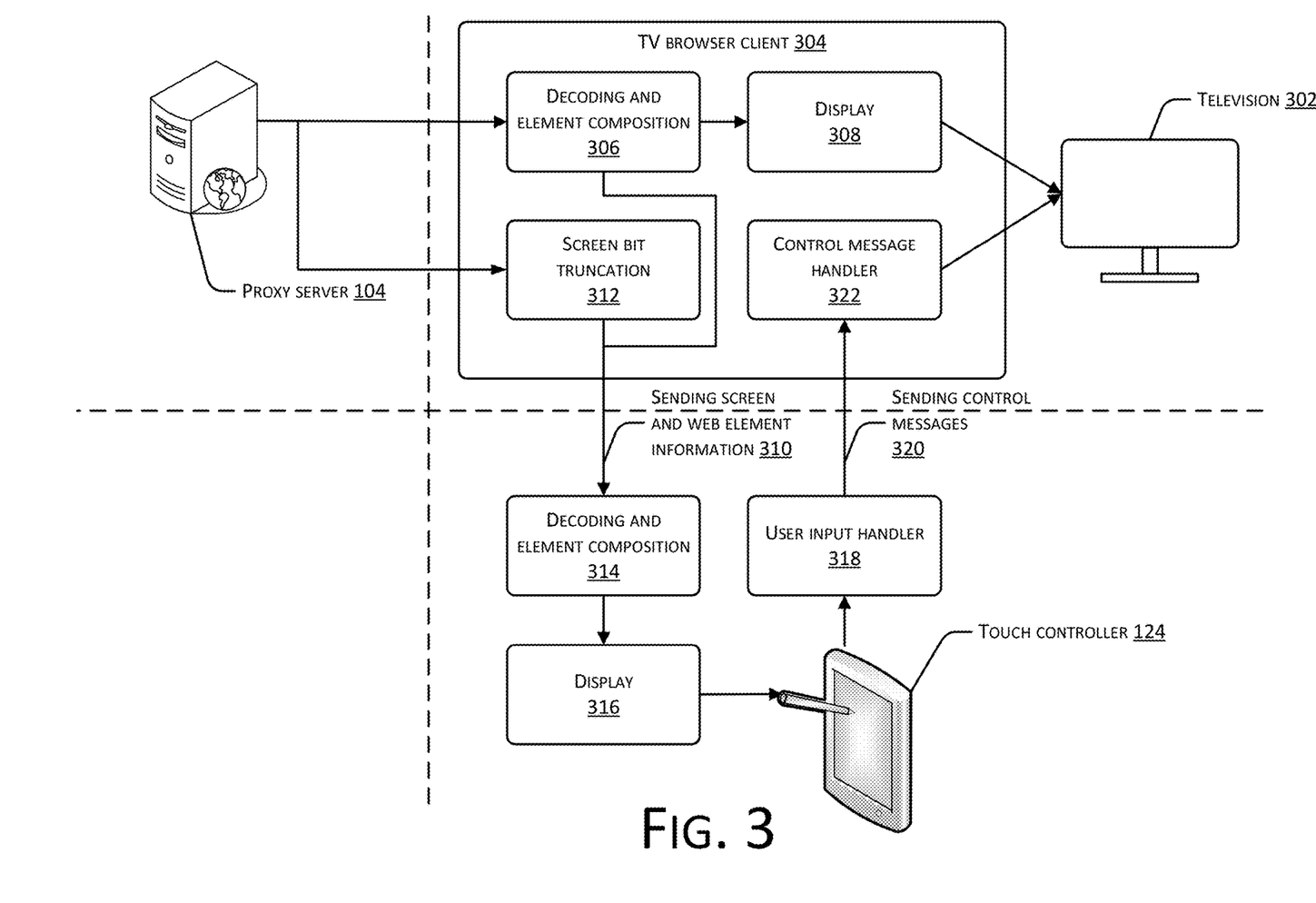
FIG. 3 illustrates an example architecture usable to implement an example touch controller included in the example cooperative web browsing system of FIG. 1.

FIG. 3 illustrates an example architecture of the example touch controller 124 for web browsing based on a thin-client browser framework. In this example, the touch controller 124 is illustrated to be used as a remote controller for a television 302. However, the touch controller 124 is not limited thereto and can be used as a remote controller for other types of devices. In this example, the television 302 may include a limited TV browser client 304. For example, the television 302 may be associated with the limited TV browser client 304 provided by other devices such as set-top box, game console or other companion device which usually has general computing capabilities. The TV browser client 304 may receive compressed (and/or encoded) screen, audio and web elements from the proxy server 104, and decode 306 the compressed screen, audio and web elements for presentation 308 in the television 302 to the user 122.

Additionally, the TV browser client 304 may further send 310 screen data and the web elements to the touch controller 124 through the local network 106 to enable user-friendly interaction, for example. In some embodiments, the TV browser client 304 may truncate 312 the screen data (or bits) and send. In one embodiment, the touch controller 124 may decode 314 and present 316 the web screen to the user 122. The touch controller 124 may further receive and process 318 various user input operations of the user 122 including, for example, clicking, scrolling, text inputting, zooming, panning, etc., on a display of the touch controller 124. In one embodiment, the touch controller 124 may further employ the web-element side information to enable quick response to an input of the user 122.

By way of example and not limitation, when the user 122 clicks or selects a web element, the touch controller 124 may responds correspondingly based on a type of the web element. For example, if the user 122 clicks or selects a web element such as a hyperlink in the touch controller 124, the touch controller 124 may highlight the clicked web element and indicate to the user 122 that associated user input has been accepted, thereby avoiding duplicated clicks or selections. For another example, if the user 122 clicks a text input box displayed in the touch controller 124, the touch controller 124 may display an input box and a soft keyboard to the user 122 for user input with or without causing a corresponding display of the input box and the soft keyboard in the television, for example.

Additionally or alternatively, in some embodiments, the touch controller 124 may further allow the user 122 to perform various input gestures on the touch controller 124 to alter the portion of the web page displayed on the display of the touch controller 124 without altering the content of the web page displayed in the other client device (i.e., the television in this example). For example, the touch controller 124 may allow the user 122 to move to have another portion of the web page to be displayed in the touch controller 124, zoom in or out of the portion of the web page currently displayed, etc., without causing a change to the content of the web page displayed in the other client device.

In response to receiving the user input operations, the touch controller 124 may send 320 information of these user input operations as control messages to the TV browser client 304. In response to receiving the information of these user input operations from the touch controller 124, the TV browser client 304 may update 322 content of the web page to be displayed in the television according to the received control messages. Additionally or alternatively, in some embodiments, the touch controller 124 may send information of these user input operations as control messages to the proxy server 104 which may send updated samples to the TV browser client 304 for presentation to the user 122.

In one embodiment, since spatial and temporal resolutions or criteria may be different for the television and the touch controller 124 (which usually has a smaller display size), a spatially downsized web page image or screen may be sent to the touch controller 124 in order to save power and avoid unnecessary bandwidth consumption. Furthermore, the web image or screen on the touch controller 124 may be updated at a lower frame rate than that of the TV browser client 304. In order to achieve this effect, in one embodiment, the TV browser client 304 may transcode web page images or screens received from the proxy server 104 to images or screens with downsized spatial size and send the downsized images or screens at a lower frame rate that is suitable or acceptable for presentation in the touch controller 124. Additionally or alternatively, in some embodiments, the proxy server 104 or the sample encoder 222 may employ a scalable screen encoding algorithm to support multiple decodable spatial regions and temporal frame rates in a single stream. With this scalable stream, the TV browser client 304 may only need to truncate screen bits of the web page images and screens received from the proxy server 104, select and send to the touch controller 124 base-layer bits that provide the downsized spatial region and frame rate without transcoding.

Figure 4:
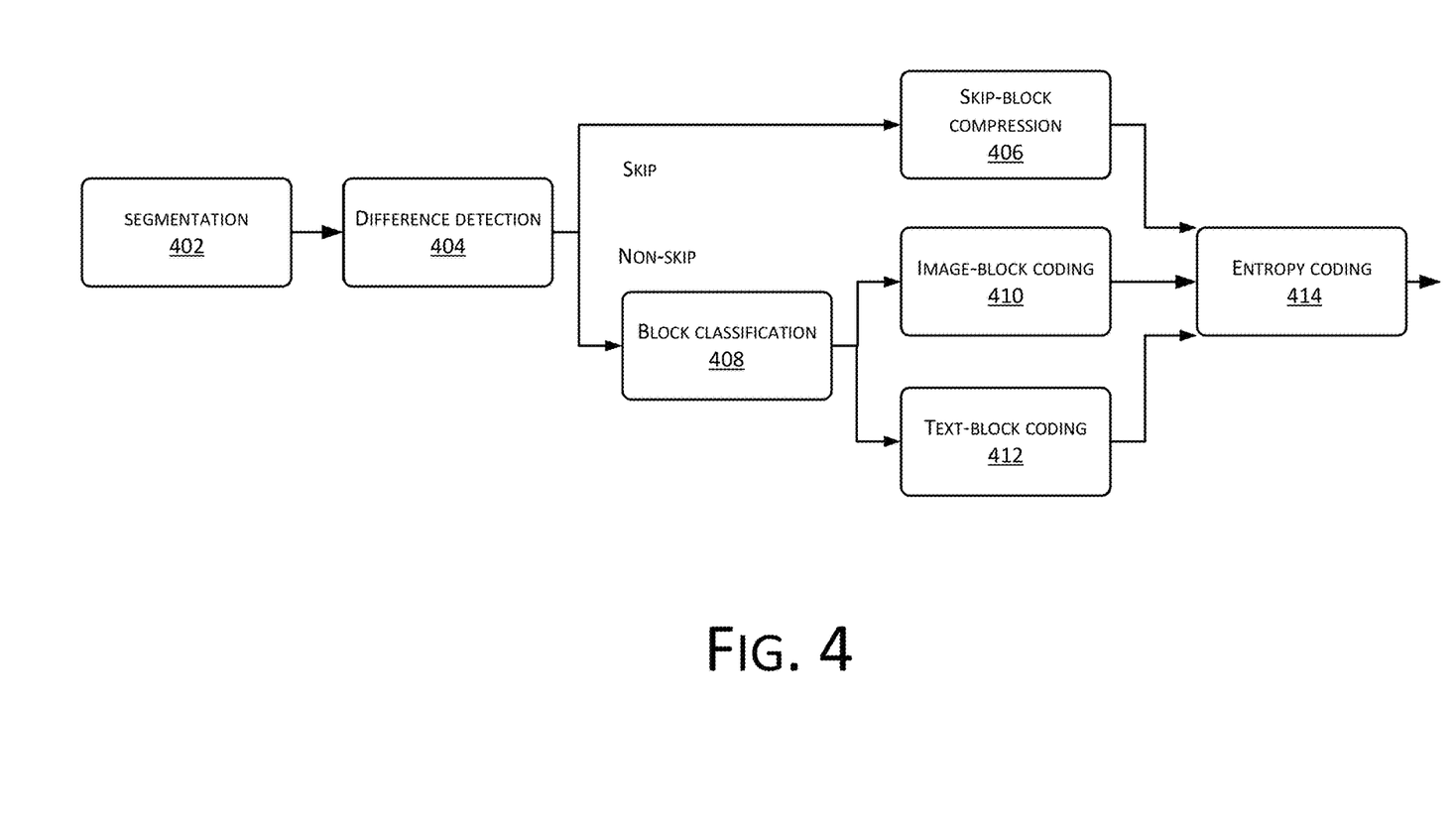
FIG. 4 illustrates an example single-layer encoding algorithm.

FIG. 4 illustrates an example single layer screen encoding algorithm that may be used by the sample encoder 222. In one embodiment, the sample encoder 222 may first segment 402 each web page image into a number of un-overlapped blocks (e.g., un-overlapped 16×16 blocks). The sample encoder 222 may then perform difference detection 404 for each of these blocks between two successive web page images or frames. In one embodiment, the sample encoder 222 may identify one or more blocks that are not changed between two successive web page images or frames as skipped blocks. For example, the sample encoder 222 may identify that a block is changed between successive web page images or frames as a skipped block if a difference between respective blocks in the successive web page images or frames is less than a predetermined threshold. Otherwise, the sample encoder 222 may identify the block as a non-skipped block. In one embodiment, the sample encoder 222 may not perform further processing (except compression operation 406, for example) for the skipped blocks.

Upon performing difference detection 404, the sample encoder 222 may classify 408 the non-skipped blocks into image blocks and text blocks based on, for example, respective contents. In one embodiment, the sample encoder 222 may classify a non-skipped block having sharp edges and/or a limited number of colors as a text block, and classify the block as an image block otherwise. Additionally or alternatively, in some embodiments, the sample encoder 222 may employ the web-element side information (such as the type and the position of the web-elements) to determine whether a non-skipped block is a text block or an image block. For example, the sample encoder 222 may find that a non-skipped block is within an area corresponding to text information of the web page based on the web-element side information and determine that the non-skipped block is a text block.

Upon classifying the non-skipped blocks into image blocks and text blocks, the sample encoder 222 may encode the image blocks and the text blocks using different coding schemes. By way of example and not limitation, the sample encoder 222 may encode 410 the image blocks using, for example, a DCT (Discrete Cosine Transform) coding scheme, and encode 412 the text blocks using, for example, a pixel domain coding scheme. Upon encoding the image blocks and the text blocks, the sample encoder 222 may compress the image blocks and the text blocks using a compression algorithm such as entropy coding 414, for example.

Figure 5:
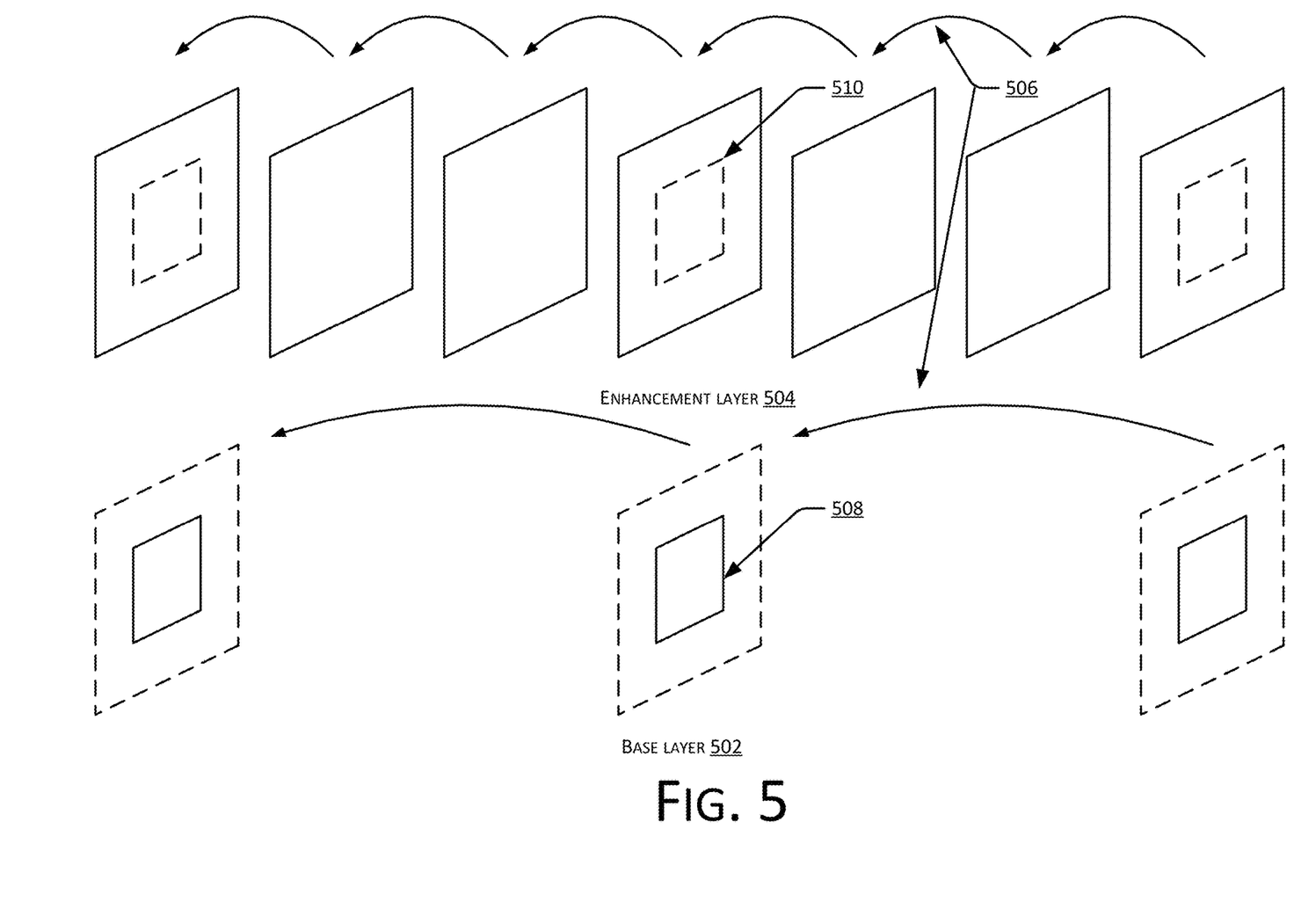
FIG. 5 illustrates an example scalable encoding framework.

Additionally or alternatively, in one embodiment, the sample encoder 222 may employ a scalable screen encoding algorithm. FIG. 5 illustrates an example scalable screen compression framework for the scalable screen encoding algorithm. As shown in FIG. 5, the scalable screen compression framework includes two layers—one is a base layer 502 and the other is an enhancement layer 504. A solid line arrow 506 in FIG. 5 represents a temporal reference relationship between corresponding two screen frames. In one embodiment, a solid rectangle 508 in the base layer 502 corresponds to an encoded region visible to the touch controller 124, and content outside this visible region of the touch controller 124 is not encoded in the base layer 502. Temporally a web page image or screen may be updated with a relatively low frequency in the base layer 502 (e.g., one frame per second) as compared to that of the enhancement layer 504. Furthermore, a current frame that is displayed in the touch controller 124 may take a frame with a temporally longer distance as reference. In one embodiment, the visible region of the touch controller 124 may vary when the user 122 scrolls or pans the content displayed in the touch controller 124, for example. Additionally, the region of updated content in the base layer 502 may also change accordingly.

In some embodiments, the enhancement layer 504 may include content in a larger region than the base layer 502, which may correspond to a visible region of a client device having a larger display such as the television 302 (and/or the TV browser client 304). Since some sub-region contents have been updated in the base layer 502, the sample encoder 222 may skip these sub-region content in the enhancement layer 504, as denoted by the dashed rectangle 510 in the enhancement layer 504, which corresponds to the solid rectangle 508 in the base layer 502. In the temporal dimension, the enhancement layer 504 may update the content in a higher frame rate, e.g., 20 fps.

With this scalable encoding framework, the proxy server 104 or the TV browser client 304 may only send frames in the base layer 502 to the touch controller 124, while an entire stream (including frames in the base layer 502 and the enhancement layer 504) is sent to the TV browser client 304 for decoding and presentation in the television for the user 122. Furthermore, in one embodiment, the sample encoder 222 may encode the sub-region content of a full-size screen of the other client device 108 (i.e., the television in this example) in the base layer 502 rather than a down-sampled version of the full-size screen of the other client device 108. It is because clickable or selectable web elements may be too small and/or clustered together in the display of the touch controller 124 for the down-sampled version. In an alternative embodiment, however, the sample encoder 222 may encode a down-sampled version of the full-size screen of the other client device 108 in the base layer 502 if, for example, receiving a request from the user 122.

Figure 6A:
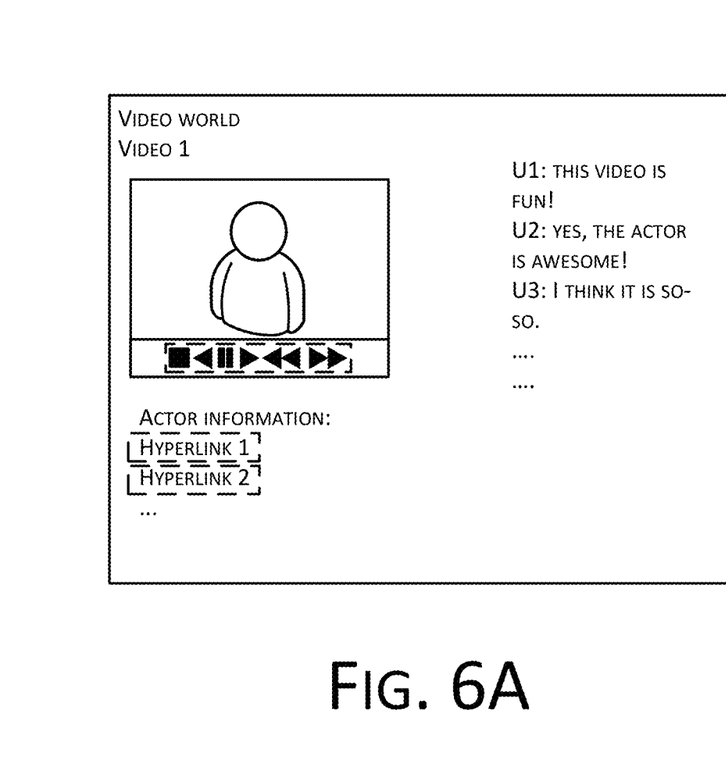
FIGS. 6A and 6B illustrate an example scenario showing how content displayed in the example touch controller of FIG. 3 changes in response to receiving a user input.
Figure 6B:
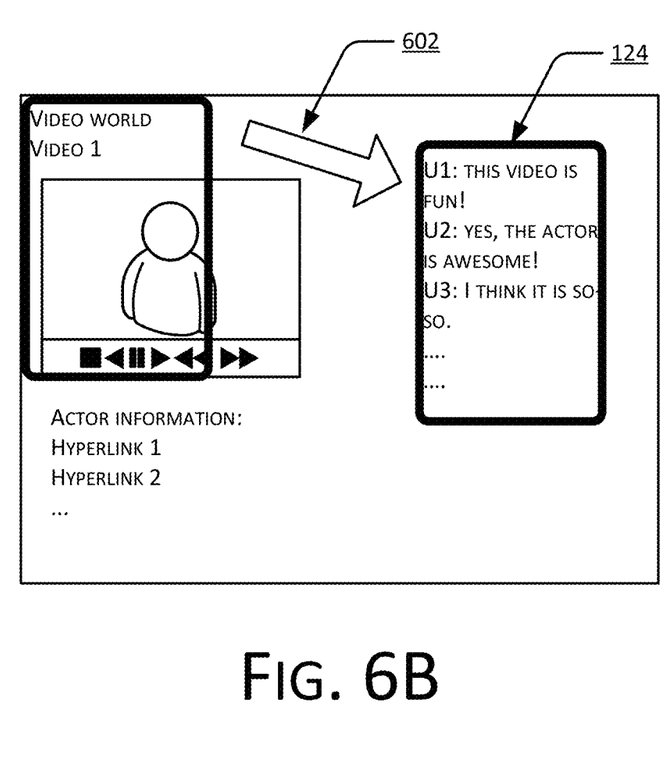

FIGS. 6A and 6B illustrate an example scenario when content displayed in the touch controller 124 changes due to a user input. FIG. 6A illustrates content and web elements rendered and extracted by the virtual browser 218 of the proxy server 104. FIG. 6B illustrates an update of content displayed in the touch controller 124 in response to receiving a panning or moving operation (as represented by an arrow 602) from the user 122.

In one embodiment, the proxy server 104 may receive a request from the user 122 for migrating a browsing session from one client device to another client device. A migration of a browsing session herein refers to a scenario that web browsing content of the browsing session is migrated from one client device to another client device. For example, the user 122 may be using a first client device (e.g., the client device 108-1) for playing an online video and want to move the browsing session associated with the online video from the first client device 108-1 to a second client device (such as the client device 108-2) while content of the online video is displayed continuously despite the client devices 108-1 and 108-2 are different.

In one embodiment, during the migration, the proxy server 104 may fully preserve the states of the browsing session of the first client device 108-1, including information inputted by the user 122 using the first client device 108-1 (such as information inputted by the user 122 into a textbox, a form, etc., in the web page), browsing history, cookies, cache, a playback position of media content (such as video, audio, etc.), a running state of an application program (e.g., JAVASCRIPT®, FLASH®, etc.) associated with the browsing session, etc. The proxy server 104 may store these states of the browsing session in an instance of the virtual browser 218 corresponding to the browsing session of the first client device 108-1. In one embodiment, the proxy server 104 may employ information of these states to restore the browsing session in the second client device 108-2. Furthermore, the proxy server 104 may employ information of these states to help reducing a migration delay of the browsing session from the first client device 108-1 to the second client device 108-2 such that the user 122 may feel the two client devices 108-1 and 108-2 to be bridged seamlessly.

In one embodiment, the proxy server 104 may achieve a session migration by changing a link relationship between an instance of the virtual browser 218 and the client device 108 (from which corresponding browsing session is migrated). For example, the proxy server 104 may receive from the first client device 108-1 a migration request including a migration destination (i.e., the second client device 108-2). In response to receiving the migration request, the proxy server 104 may link a browsing session originally associated with the first client device 108-1 to the second client device 108-2. For example, the proxy server 104 may redirect a connection of an instance of the virtual browser 218 associated with the browsing session from the first client device 108-1 to the second client device 108-2. Thereafter, the instance of the virtual browser 218 (which was originally lined to the first client device 108-1) may send the rendered and encoded content (e.g., rendered screen, audio and web elements) associated with the browsing session to the second client device 108-2. Furthermore, user inputs or control messages from the second client device 108-2 may be redirected to the browsing session associated with this same instance of the virtual browser 218. Since the proxy server 104 stores all browsing state information in the instance of the virtual browser 218, the proxy server 104 (and the virtual browser 218) may complete this session migration statefully and provide a temporally seamless experience to the user 122.

Furthermore, the proxy server 104 may enable different modes of session migrations between client devices 108, including, for example, a move mode, a copy mode and a switch mode. The proxy server 104 may perform differently depending on which mode of session migration the user 122 is requesting. By way of example and not limitation, if the user 122 requests a move mode of session migration from a first client device to a second client device, the proxy server 104 may redirect an instance of the virtual browser 218 of the first client device to the second client device. Additionally, in some embodiments, the proxy server 104 may further destroy an original instance of the virtual browser 218 of the second client device, if one exists. In an alternative embodiment, the proxy server 104 may still maintain an original instance of the virtual browser 218 of the second client device (if one exists).

Additionally, in some embodiments, if the user 122 requests to copy a browsing session of a first client device to a second client device, the proxy server 104 may redirect an instance of the virtual browser 218 of the first client device to the second client device. Additionally, the proxy server 104 may create or construct a new instance of the virtual browser 218 for the first client device. In one embodiment, the proxy server 104 may retrieve original browsing history and browsing state information of the first client device to initiate the new instance of the virtual browser 218. For example, the user 122 may find an interesting video when browsing on the mobile phone and may want to migrate the video to the television. The proxy server 104 may therefore migrate an associated browsing session from the mobile phone to the television, and create a new browsing session with original browsing session information the mobile phone so that the user 122 may resume to use the mobile phone to read and post comments about the video on the same page as the television.

Additionally or alternatively, in some embodiments, if the user 122 requests to switch a first browsing session of a first client device with a second browsing session of a second client device, the proxy server 104 may redirect a first instance of the virtual browser 218 associated with the first browsing session of the first client device to the second client device, and redirect a second instance of the virtual browser 218 associated with the second browsing session of the second client device to the first client device. For example, the user 122 may watch a video on a television while reading twitter on a mobile phone. After a short while the user 122 may want to read comments in a web page associated with the video and publish his/her own idea without missing updates in twitter. In this case the user 122 may switch between two browsing sessions of the television and the mobile phone. From another perspective, this may amount to taking a display of the television as an extended display of the mobile phone.

Although the foregoing embodiments describe session migration upon receiving a request from the user 122, in some embodiments, the proxy server 104 may perform session migration automatically. By the way of example and not limitation, the proxy server may migrate or transfer a browsing session of a first client device (e.g., the client device 108-1) to a second client device (e.g., the client device 108-2) automatically in response to detecting a presence of the second client device in a neighborhood of the first client device and determining that the second client device has a better capability of serving a type of content that is currently provided to the first client device by the proxy server 104 in comparison with the first client device. For example, the user 122 may watch an online video on the way home using a mobile phone. When the user 122 comes to a location (e.g., home) where the cooperative web browsing system 102 or the proxy server 104 is located, the user 122 may want to continue to watch the online video on another client device such as a television. Upon turning on the television, the proxy server 104 may detect a presence of the television in the neighborhood of the mobile phone in which the online video is played and further determine that a display capability (such as display resolution or quality) is better than that of the mobile phone. The proxy server 104 may infer that the user 122 wants to transfer a browsing session associated with the online video on the mobile phone to the television, and automatically perform the session migration on behalf of the user 122.

Exemplary Methods

Figure 7:
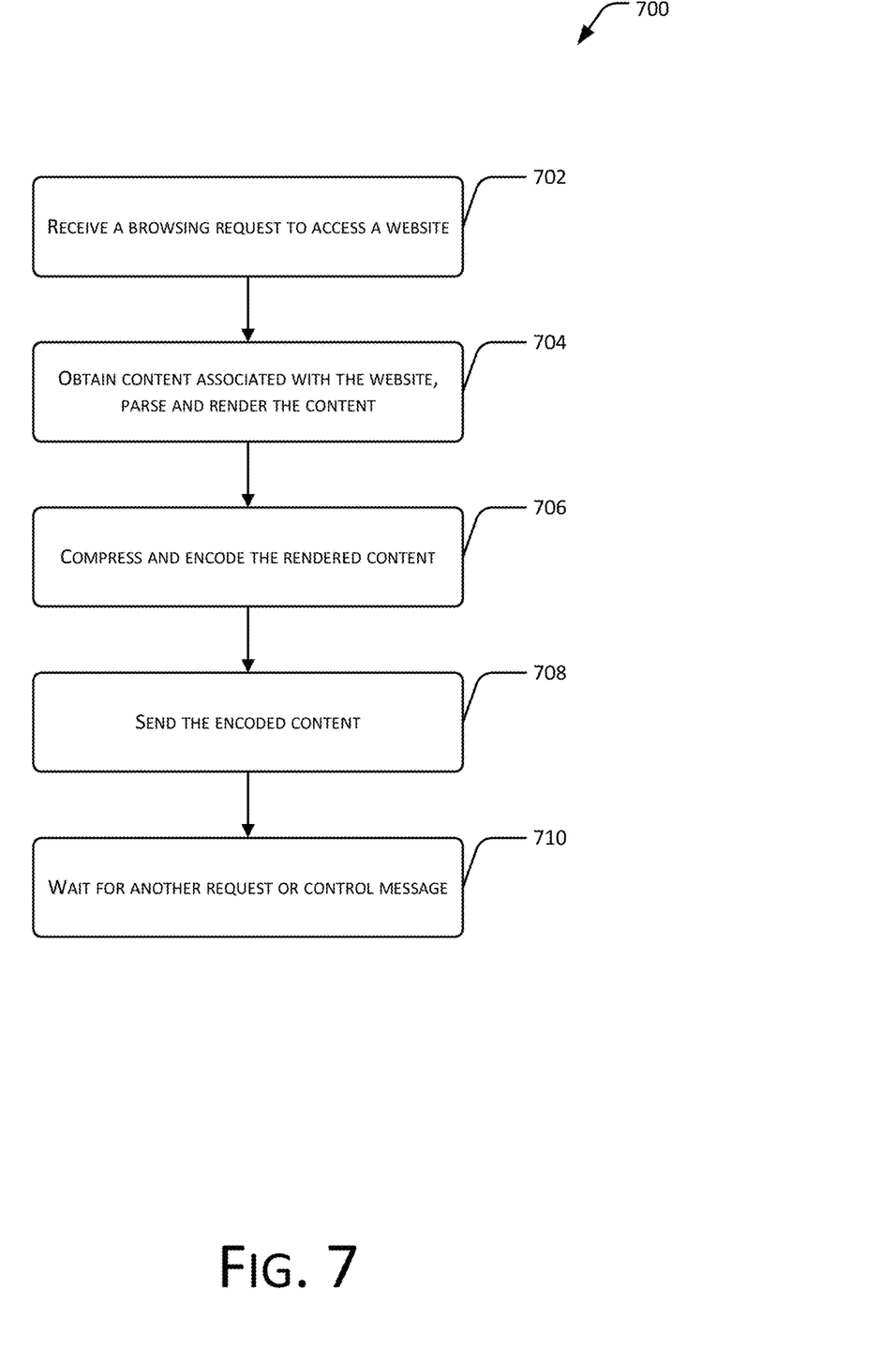
FIG. 7 illustrates an example method of proxy-based cooperative web browsing using multiple devices.
Figure 8:
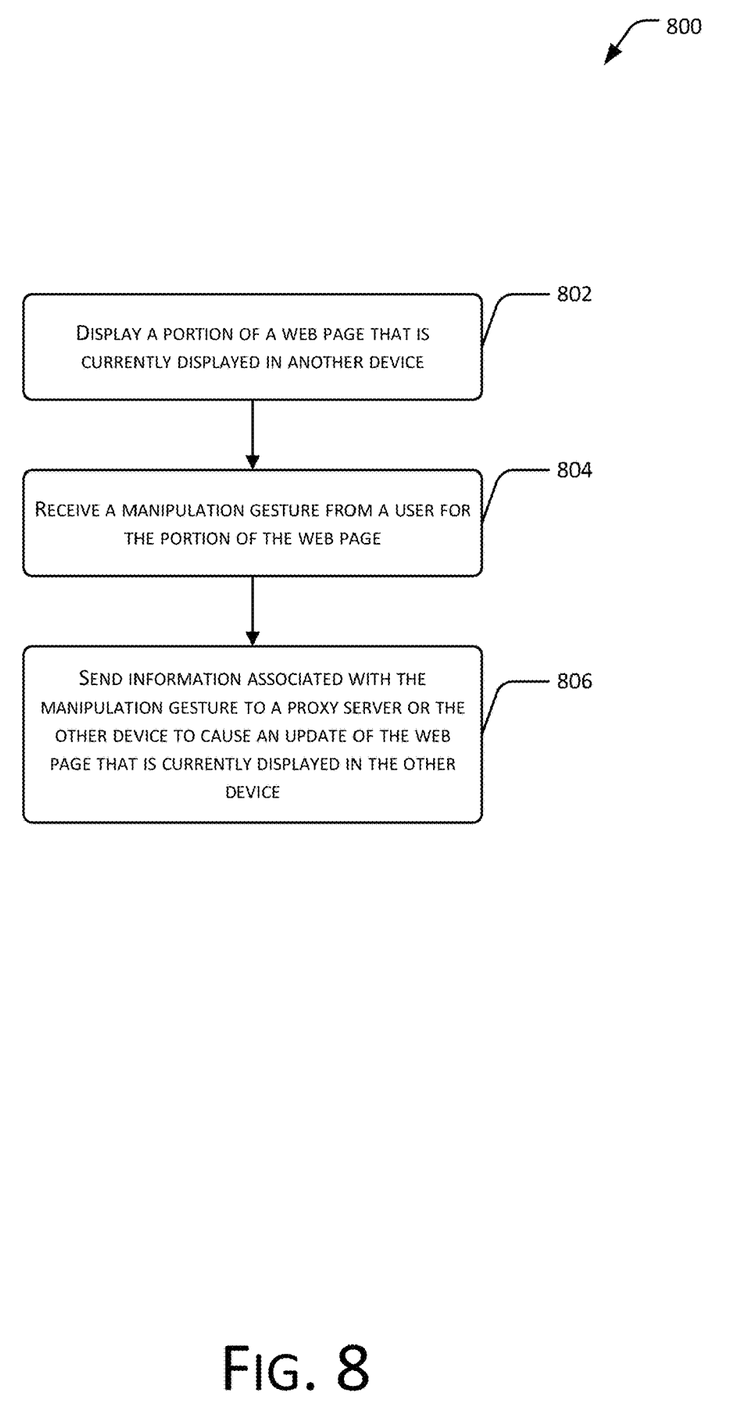
FIG. 8 illustrates an example method of using the example touch controller in cooperative web browsing.
Figure 9:
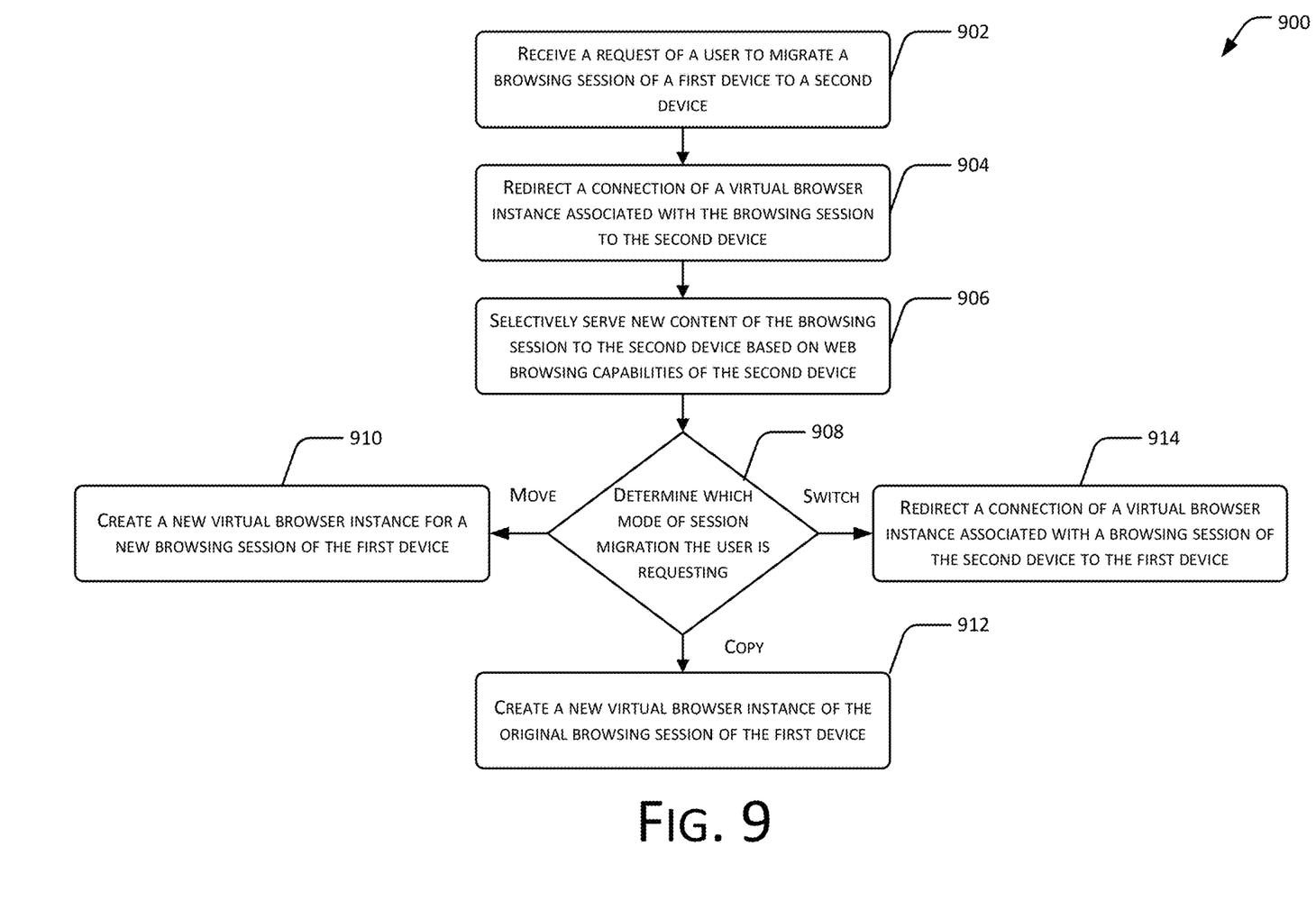
FIG. 9 illustrates an example method of session migration.

FIG. 7 is a flow chart depicting an example method 700 of cooperative web browsing of multiple devices. FIG. 8 is a flow chart depicting an example method 800 of using the example touch controller 124 in cooperative web browsing. FIG. 9 is a flow chart depicting an example method 900 of session migration. The methods of FIG. 7-9 may, but need not, be implemented in the environment of FIG. 1 and using the systems of FIGS. 2 and 3. For ease of explanation, methods 700, 800 and 900 are described with reference to FIGS. 1-3. However, the methods 700, 800 and 900 may alternatively be implemented in other environments and/or using other systems.

Methods 700, 800 and 900 are described in the general context of computer-executable instructions. Generally, computer-executable instructions can include routines, programs, objects, components, data structures, procedures, modules, functions, and the like that perform particular functions or implement particular abstract data types. The methods can also be practiced in a distributed computing environment where functions are performed by remote processing devices that are linked through a communication network. In a distributed computing environment, computer-executable instructions may be located in local and/or remote computer storage media, including memory storage devices.

The exemplary methods are illustrated as a collection of blocks in a logical flow graph representing a sequence of operations that can be implemented in hardware, software, firmware, or a combination thereof. The order in which the methods are described is not intended to be construed as a limitation, and any number of the described method blocks can be combined in any order to implement the method, or alternate methods. Additionally, individual blocks may be omitted from the method without departing from the spirit and scope of the subject matter described herein. In the context of software, the blocks represent computer instructions that, when executed by one or more processors, perform the recited operations. In the context of hardware, some or all of the blocks may represent application specific integrated circuits (ASICs) or other physical components that perform the recited operations.

Referring back to FIG. 7, at block 702, the proxy server 104 may receive a browsing request (or a connection request) from a user (e.g., the user 122) to access or browse a website through the cooperative web browsing system 102.

At block 704, upon receiving the request, the proxy server 104 may obtain content of a web page associated with the website, parse and render the content into a display bitmap. The proxy server 104 may further extract other content including, for example, audio and web elements from the web page.

At block 706, the proxy server 104 may compress and/or encode the rendered content using a scalable screen encoding algorithm.

At block 708, in response to compressing and/or encoding the rendered content, the proxy server 104 may send the encoded content to the client device 108 for presenting to the user 122.

At block 710, the proxy server 104 may wait for another request or control message from the client device 108 (from which the browsing request is sent) or another client device 108 of the user 122.

Referring back to FIG. 8, at block 802, the touch controller 124 may display a portion less than all of a web page currently displayed at another client device 108 that is incapable of manipulating the web page, e.g., having no physical or soft keyboard, having no or limited web browser, etc.

At block 804, the touch controller 124 may receive a manipulation gesture from a user to manipulate the portion of the web page that is displayed at the first device. By way of example and not limitation, the manipulation gesture may include, but is not limited to, selecting or clicking a hyperlink, actuating a control on the portion of the web page, etc.

At block 806, in response to receiving the manipulation gesture from the user, the touch controller 124 may send information associated with the manipulation gesture to the proxy server 104 or the other client device 108 to cause updating of the web page that is currently displayed at the other client device 108. In one embodiment, the proxy server 104 may serve different portions of the web page or different web pages to the touch controller 124 and the other client device 108 in response to this manipulation gesture.

Referring back to FIG. 9, at block 902, the proxy server 104 may receive a request to transfer a browsing session of a first client device to a second client device.

At block 904, in response to receiving the request, the proxy server 104 may redirect a connection of an instance of a virtual browser associated with the browsing session of the first client device at the proxy server from the first client device to the second client device without determining which mode of session migration request the user 122 is requesting. This speeds up the session migration to the second client device and facilitates seamless migration of the browsing session from one client device to another client device.

At block 906, the proxy server 104 may selectively serve new content of the browsing session to the second device based on one or more capabilities of the second device.

At block 908, the proxy server 104 may determine which mode of migration request the user 122 is requesting. Example modes of session migration may include, for example, a move mode, a copy mode and a switch mode.

At block 910, in response to determining that the user 122 requests to move the browsing session of the first client device to the second client device, the proxy server 104 may create a new virtual browser instance of a new browsing session for the first client device.

At block 912, in response to determining that the user 122 requests to copy the browsing session of the first client device to the second client device, the proxy server 104 may create a new virtual browser instance of the original browsing session for the first client device by retrieving original browsing history and browsing state information of the first client device to initiate the new virtual browser instance.

At block 914, in response to determining that the user 122 requests to switch the browsing session of the first client device with a browsing session of the second client device, the proxy server 104 may redirect a connection of an instance of a virtual browser associated with the browsing session of the second client device at the proxy server from the second client device to the first client device.

Any of the acts of any of the methods described herein may be implemented at least partially by a processor or other electronic device based on instructions stored on one or more computer-readable media. By way of example and not limitation, any of the acts of any of the methods described herein may be implemented under control of one or more processors configured with executable instructions that may be stored on one or more computer-readable media such as one or more computer storage media.

CONCLUSION

Although the invention has been described in language specific to structural features and/or methodological acts, it is to be understood that the invention is not necessarily limited to the specific features or acts described. Rather, the specific features and acts are disclosed as exemplary forms of implementing the invention.

What is claimed is:

1. A system comprising:
a processor; and
a memory communicatively coupled to the processor and storing computer-executable instructions that, when executed by the processor, perform operations comprising:
receiving, by a proxy server, access information from a first device, wherein the access information is associated with a browsing request to access content, the content being web content;
in response to receiving the access information, providing the first device access to a virtual browser for accessing the content;
detecting, by the proxy server, the first device displaying the content is within a neighborhood of a second device for displaying the content;
comparing a capability of the first device for displaying or interacting with the content with a capability of the second device for displaying or interacting with the content; and
based on determining the capability of the second device exceeds the capability of the first device, automatically providing, by the proxy server, at least a portion of the content to the second device such that the at least a portion of the content is to be displayed on the second device while the content is displayed on the first device.

2. The system of claim 1, further comprising instructions for:
receiving an input instruction from the first device; and
based on receiving the input instruction, sending information associated with the input instruction to the second device.

3. The system of claim 2, wherein the input instruction is a gesture.

4. The system of claim 2, wherein the input instruction causes a manipulation of the at least the portion of content displayed on the second device.

5. The system of claim 1, wherein the capability of the first device comprises at least one of a display resolution, an audio quality, a data input function or processing power.

6. The system of claim 1, wherein the capability for the first and the second device is a size of a display screen or web browser functionality.

7. The system of claim 1, wherein the virtual browser retrieves, parses, and renders the content on behalf of the first device and the second device.

8. The system of claim 1, wherein:
the second device is a member of a cooperative web browser system; and
in response to providing the access information to the proxy server, receiving, by the second device from the proxy server, a notification that the first device has connected to the cooperative web browser system.

9. The system of claim 8, wherein the cooperative web browser system enables the content to be migrated between the first device, the second device, and one or more other device connected to the cooperative web browser system.

10. A method comprising:
receiving, by a proxy server, access information from a first device, wherein the access information is associated with a browsing request to access web content;
in response to receiving the access information, providing the first device access to a virtual browser for accessing the web content;
while the first device is displaying the content, detecting, by the proxy server, the first device is within a neighborhood of a second device for displaying the content;
comparing a display capability of the first device for displaying or interacting with the content with a display capability of the second device for displaying or interacting with the content;
based on determining the display capability of the second device exceeds the display capability of the first device, causing, by the proxy server, the second device to concurrently display at least a portion of the content being displayed on the first device;
receiving, at the second device, an instruction from the first device, the instruction being based on a user request received by the first device; and based on receiving the instruction from the first device, causing the second device to alter the at least the portion of the content being displayed on the second device.

11. The method of claim 10, wherein the instruction corresponds to a gesture.

12. The method of claim 10, wherein the display capability of the first device comprises at least one of a display resolution, an audio quality, a data input function or processing power.

13. The method of claim 10, further comprising compressing the at least the portion of content prior to sending the content to the second device.

14. A method, comprising:
receiving, by a proxy server, access information from a first device having a first display, wherein the access information is associated with a browsing request to access a web page;
in response to receiving the access information, providing the first device access to a virtual browser for accessing the web page;
when the first device is displaying at least a portion of the web page on the first display, detecting, by the proxy server, a second device having a second display is within a neighborhood of the first device; and
based on determining, by the proxy server, that the second display has a better capability for displaying or interacting with the portion of the web page than the first display, automatically displaying the portion of the web page on the second display such that the portion of the web page is concurrently displayed on the first device and the second device.

15. The method of claim 14, further comprising receiving, from the first device, a manipulation instruction that causes the displayed portion of the web page on the second device to be manipulated.

16. The method of claim 15, wherein the manipulation instruction is a gesture.

17. The method of claim 14, wherein the capability for displaying or interacting with the portion of the web page comprises at least one of a display resolution, an audio quality, a data input function or processing power.

18. The method of claim 14, further comprising compressing content of the web page prior to sending the content to the second device.

19. The method of claim 14, wherein the virtual browser renders the web page on behalf of at least one of the first device or the second device.

20. The method of claim 14, wherein the first device and the second device are members of a cooperative web browsing system.

* * * * *